US008799820B2

(12) United States Patent
Pascal et al.

(10) Patent No.: US 8,799,820 B2
(45) Date of Patent: Aug. 5, 2014

(54) DYNAMICALLY SCALED MESSAGING CONTENT

(75) Inventors: Kristin Marie Pascal, Kirkland, WA (US); Andrew Klonsky, Portland, OR (US); Matthew Bailey, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 593 days.

(21) Appl. No.: 12/343,388

(22) Filed: Dec. 23, 2008

(65) Prior Publication Data

US 2010/0158097 A1 Jun. 24, 2010

(51) Int. Cl.
*H04B 1/66* (2006.01)

(52) U.S. Cl.
USPC .......................................... 715/838; 375/240

(58) Field of Classification Search
USPC .......................................... 715/838; 375/240
See application file for complete search history.

(56) References Cited

U.S. PATENT DOCUMENTS

| | | | | |
|---|---|---|---|---|
| 5,880,731 | A | | 3/1999 | Liles |
| 5,894,305 | A | | 4/1999 | Needham |
| 5,943,679 | A | * | 8/1999 | Niles et al. ................. 715/247 |
| 5,983,265 | A | * | 11/1999 | Martino, II ................. 709/206 |
| 6,061,659 | A | * | 5/2000 | Murray ..................... 705/14.73 |
| 6,177,931 | B1 | | 1/2001 | Alexander |
| 6,434,604 | B1 | | 8/2002 | Harada |
| 6,545,687 | B2 | * | 4/2003 | Scott et al. ................. 345/629 |
| 6,865,599 | B2 | * | 3/2005 | Zhang ........................ 709/218 |
| 7,086,005 | B1 | | 8/2006 | Matsuda |
| 7,124,164 | B1 | * | 10/2006 | Chemtob .................... 709/204 |
| 7,164,937 | B2 | * | 1/2007 | Schnurr ...................... 455/566 |
| 7,218,943 | B2 | | 5/2007 | Klassen |
| 7,343,561 | B1 | * | 3/2008 | Stochosky et al. .......... 715/758 |
| 7,353,466 | B2 | * | 4/2008 | Crane et al. ................ 715/752 |
| 7,386,799 | B1 | | 6/2008 | Clanton |
| 7,386,801 | B1 | * | 6/2008 | Horvitz et al. .............. 715/764 |
| 7,392,288 | B2 | | 6/2008 | Ooi et al. |
| 7,421,690 | B2 | | 9/2008 | Forstall |
| 7,536,650 | B1 | * | 5/2009 | Robertson et al. .......... 715/767 |
| 7,546,537 | B2 | * | 6/2009 | Crawford .................... 715/753 |
| 7,629,765 | B2 | * | 12/2009 | Chen et al. ................. 320/106 |

(Continued)

FOREIGN PATENT DOCUMENTS

WO  WO2005067327 A1  7/2005

OTHER PUBLICATIONS http://www.openwave.com/us/news_room/press_releases/2002/20020319_opwv_mmsandsms_0319.htm. Retrieved Feb. 20, 2009.
www.3jam.com. Retrieved Feb. 20, 2009.

(Continued)

*Primary Examiner* — Weilun Lo
*Assistant Examiner* — Jessica Chuang
(74) *Attorney, Agent, or Firm* — Amin, Turocy & Watson, LLP

(57) ABSTRACT

The claimed subject matter provides for systems, devices, and methods facilitating dynamic scaling of messaging content. Messaging content can include visual content other than the actual textual content of a message body for a messaging environment. In an aspect dynamic scaling of messaging content can allow message content such as pictures, images, emoticons, movies, maps, and the like to be presented to a user in a manner that facilities efficient comprehension of the message content. The tokens can be dynamically scaled as the messaging environment changes to maintain high levels of comprehension.

28 Claims, 10 Drawing Sheets

(56) References Cited

U.S. PATENT DOCUMENTS

| | | | | |
|---|---|---|---|---|
| 7,680,809 | B2* | 3/2010 | Deng et al. | 707/706 |
| 7,761,507 | B2* | 7/2010 | Herf et al. | 709/204 |
| 7,864,163 | B2* | 1/2011 | Ording et al. | 345/173 |
| 7,881,656 | B2* | 2/2011 | Khedouri et al. | 455/3.01 |
| 8,009,921 | B2* | 8/2011 | Csurka | 382/228 |
| 8,260,367 | B2* | 9/2012 | Chan | 455/567 |
| 8,296,434 | B1* | 10/2012 | Miller et al. | 709/226 |
| 2002/0000998 | A1* | 1/2002 | Scott et al. | 345/667 |
| 2002/0130904 | A1* | 9/2002 | Becker et al. | 345/753 |
| 2003/0101235 | A1* | 5/2003 | Zhang | 709/218 |
| 2003/0228909 | A1 | 12/2003 | Tanaka | |
| 2004/0260756 | A1 | 12/2004 | Forstall | |
| 2005/0004985 | A1 | 1/2005 | Stochosky | |
| 2005/0004995 | A1 | 1/2005 | Stochosky | |
| 2005/0021624 | A1* | 1/2005 | Herf et al. | 709/204 |
| 2005/0037815 | A1* | 2/2005 | Besharat et al. | 455/566 |
| 2005/0038863 | A1* | 2/2005 | Onyon et al. | 709/207 |
| 2006/0184609 | A1* | 8/2006 | Deng | 709/203 |
| 2006/0195429 | A1* | 8/2006 | Arrouye et al. | 707/3 |
| 2006/0195506 | A1* | 8/2006 | Deng | 709/203 |
| 2006/0277271 | A1 | 12/2006 | Morse | |
| 2007/0073776 | A1* | 3/2007 | Kalalian et al. | 707/104.1 |
| 2007/0128899 | A1* | 6/2007 | Mayer | 439/152 |
| 2007/0152979 | A1 | 7/2007 | Jobs et al. | |
| 2007/0156910 | A1 | 7/2007 | Christie et al. | |
| 2007/0171830 | A1* | 7/2007 | Vulkan et al. | 370/235 |
| 2007/0205745 | A1* | 9/2007 | Chen et al. | 320/136 |
| 2007/0288860 | A1* | 12/2007 | Ording et al. | 715/779 |
| 2008/0034037 | A1 | 2/2008 | Ciudad | |
| 2008/0034038 | A1 | 2/2008 | Ciudad | |
| 2008/0034315 | A1 | 2/2008 | Langoulant | |
| 2008/0055269 | A1* | 3/2008 | Lemay et al. | 345/173 |
| 2008/0094368 | A1 | 4/2008 | Ording | |
| 2008/0094369 | A1 | 4/2008 | Ganatra | |
| 2008/0109741 | A1* | 5/2008 | Messing et al. | 715/764 |
| 2008/0140338 | A1* | 6/2008 | No et al. | 702/141 |
| 2008/0165148 | A1 | 7/2008 | Williamson | |
| 2008/0299960 | A1* | 12/2008 | Lockhart et al. | 455/418 |
| 2009/0013048 | A1* | 1/2009 | Partaker et al. | 709/206 |
| 2009/0128530 | A1* | 5/2009 | Ek | 345/207 |
| 2009/0156172 | A1* | 6/2009 | Chan | 455/412.2 |
| 2010/0013628 | A1* | 1/2010 | Monroe | 340/539.18 |
| 2010/0062796 | A1* | 3/2010 | Hayton et al. | 455/466 |

OTHER PUBLICATIONS http://mashable.com/2007/09/20/virgin-mobile-3jam/. Retrieved Feb. 20, 2009.
http://news.cnet.com/8301-13580_3-9768707-39.html. Retrieved Feb. 20, 2009.
http://ajaxpatterns.org/Predictive_Fetch. Retrieved Feb. 20, 2009.
http://help.yahoo.com/tutorials/cg/mail/cg_chatadv2.html. Retrieved Feb. 20, 2009.
http://www.talkshoe.com/se/about/TSAbout.html. Retrieved Feb. 20, 2009.
http://en.wikipedia.org/wiki/Second_Life. Retrieved Feb. 20, 2009.
http://www.whyville.net/smmk/nice. Retrieved Feb. 20, 2009.
http://www.there.com/whatIsThere.html. Retrieved Feb. 20, 2009.
http://slfix.com/?p=658. Retrieved Feb. 20, 2009.
http://extratorrent.com/torrent/905198/Text+Message+to+TV+Screen+by+FireText.html. Retrieved Feb. 20, 2009.
http://mooseyard.com/Jens/2005/06/little-boxes-of-words/. Retrieved Feb. 20, 2009.
http://www.slashphone.com/xumii-launches-first-social-address-book-for-mobile-phones-at-demofall-08-212021, Retrieved Feb. 20, 2009.
http://www.xumii.com/ Retrieved Feb. 20, 2009.
http://www.apple.com/macosx/features/ichat.html Retrieved Feb. 20, 2009.
http://www.apple.com/macosx/features/300.htm#ichat Retrieved Feb. 20, 2009.
http://www.flickr.com/photos/rmohns/1752400601/ Retrieved Feb. 20, 2009.
http://en.wikipedia.org/wiki/Ichat Retrieved Feb. 20, 2009.
http://www.techcrunch.com/2007/08/15/most-useful-iphone-site-yet-meebo/ Retrieved Feb. 20, 2009.
http://www.appsafari.com/utilities/837/beejive-im/ Retrieved Feb. 20, 2009.
http://www.boygeniusreport.com/gallery/handsets/beejive-for-iphone/ Retrieved Feb. 20, 2009.
http://www.boygeniusreport.com/gallery/handsets/beejive-for-iphone/?pid=3076#picture_nav Retrieved Feb. 20, 2009.
http://www.ilounge.com/index.php/articles/comments/iphone-gems-the-best-instant-messaging-apps Retrieved Feb. 20, 2009.
http://www.iphonehacks.com/2007/08/iphone-mundu-im.html Retrieved Feb. 20, 2009.
http://www.iphonehacks.com/2007/07/iphone-trillian.html Retrieved Feb. 20, 2009.
http://www.group2call.com/ Retrieved Feb. 20, 2009.
http://www.appsafari.com/chat/1452/group2call Retrieved Feb. 20, 2009.
http://www.swaggle.mobi/sessions/new Retrieved Feb. 20, 2009.
http://twitter.com/ Retrieved Feb. 20, 2009.
http://www.sweetim.com/ Retrieved Feb. 20, 2009.
http://www.techcrunch.com/2006/09/27/a-look-at-eight-multi-person-sms-services/ Retrieved Feb. 20, 2009.
http://www.labnol.org/internet/google-sms-subscribe-rss-via-sms/4726/ Retrieved Feb. 20, 2009.
http://www.txtblaster.com/ Retrieved Feb. 20, 2009.
http://www.eztexting.com/ Retrieved Feb. 20, 2009.
http://in.content.mobile.yahoo.com/new/groups/tour3.html Retrieved Feb. 20, 2009.
http://www.sendgroupsms.com/ Retrieved Feb. 20, 2009.
http://www.jabber.org.au/ichat Retrieved Feb. 20, 2009.
http://www.mac.com/1/images/ichat_screenshot1_20051012.jpg Retrieved Feb. 20, 2009.
http://www.textually.org/textually/archives/2007/12/018249.htm Retrieved Feb. 20, 2009.
http://www.macupdate.com/info.php/id/24959 Retrieved Feb. 20, 2009.
http://news.cnet.com/8301-13579_3-9962739-37.html Retrieved Feb. 20, 2009.
http://modmyi.com/forums/new-skins-themes-launches/4610-sms-balloon-collection.html Retrieved Feb. 20, 2009.
http://farm2.static.flickr.com/1321/1352786329_808877273e_o.png Retrieved Feb. 20, 2009.
http://mooseyard.com/Jens/wp-content/uploads/2008/03/balloon-chat-ui-21-april-1997.png Retrieved Feb. 20, 2009.
http://www.dbug.org/publications/articles/ichat_1_review.shtml Retrieved Feb. 20, 2009.
http://iphone.cazisoft.com/?paged=11 Retrieved Feb. 20, 2009.
http://www.mysupergroups.com/tour Retrieved Feb. 20, 2009.
http://www.mysupergroups.com/faqs Retrieved Feb. 20, 2009.
http://www.cssplay.co.uk/menu/bubbles Retrieved Feb. 20, 2009.
http://www.testiphone.com/. Retrieved on Feb. 20, 2009. Cumulative citation.
http://www.tatango.com/tatango/details. Retrieved on Feb. 20, 2009.
http://www.smsgupshup.com/help. Retrieved on Feb. 20, 2009.
http://www.intomobile.com/2007/12/07/change-your-iphones-sms-text-message-bubbles-to-a-matte-finish-iphone-matte.html. Retrieved on Feb. 20, 2009. Cumulative citation.
http://www.youtube.com/watch?v=VDnzgvRh6Xk. Retrieved on Feb. 20, 2009. Cumulative citation.
http://www.eztext.com/. Retrieved on Feb. 20, 2009. Cumulative citation.
http://www.faculty.idc.ac.il/arik/IMRet-All.mov. Retrieved on Feb. 20, 2009. Cumulative citation.
http://www.iminent.com/default.aspx. Retrieved on Feb. 20, 2009. Cumulative citation.
http://www.youtube.com/watch?v=rliqNvybcR4. Retrieved on Feb. 20, 2009. Cumulative citation.
Apple Inc. "Mac 101: The Dock", published online at [http://support.apple.com/kb/ht2474] on Dec. 18, 2009, last retrieved on Sep. 17, 2011, 4 pages.

* cited by examiner

DYNAMICALLY SCALED MESSAGING CONTENT

BACKGROUND

Modern communication devices typically have mechanisms for participating in messaging service protocols such as text messaging by short messaging service (SMS), multimedia messaging service (MMS) instant messaging (IM) applications, IP messaging, email, and the like. Typically, each of these protocols remains a separate and distinct application on a user equipment. Further, many of these protocols employ communications hardware backbones that are distinct and not supportive of cross protocol interactions. As a result, many communications on modern user equipment, commonly referred to as "texting" (which includes SMS, MMS, IM, IP messaging, email, voice snippets, emoticons, visual messaging, and many others), employ multiple protocols, numerous inboxes, outboxes, and commonly third party software applications to facilitate some approximation of simplifying and unifying the numerous communication avenues.

The negative impact of overlapping and cumbersome "texting" platforms (e.g., any combination of the numerous forms of text/video/voice communications other than a traditional voice phone call) on mobile devices has not gone without notice by device manufacturers, service providers, and third party application developers. Third party developers often are the most nimble and quickest to respond with attempts at fulfilling a long-felt need such as a unified messaging platform to support "texting". However, many of these third party developers have lacked access to aspects of the hardware and core software of the myriad devices, systems, and protocols for texting. As a result, many third party applications are not robust enough, broad enough, or implemented in an attractive manner and fail to fulfill the long felt needs of the masses.

Device manufacturers and service providers generally are not as nimble as smaller third party application developers and are more constrained in business decision making, and thus rarely rush to put out product that is friendly to a competitor's product, service, or protocol. As a result, solutions for consumers' long felt needs may go unfulfilled by device manufacturers and service providers despite these entities having better access to the subsystems and core engineering that would enable them to develop a more ideal system/device in a less competitive environment.

As mobile device technologies become more ubiquitous and begin merging with more traditional computer manufacture and development, products and services are appearing for mobile devices that blur the lines between mobile and traditional notions of non-mobile devices. Interestingly, many business practices have also adapted to the coalescing mobile computing environment. One result of this is more interaction between device manufacturers and service providers in development and standards-setting environments. This is also true across competing platforms where the realization is that consumers will tend to gravitate to a less limiting service or device provider where possible and feasible. Thus, to keep customers, making devices and services more competitor-friendly has become almost a survival requirement.

The resulting more cooperative development environment is yielding improved services and devices for customers. One area of improvement that will be of great benefit to mobile device users is the move toward unification of messaging systems. There is clearly a desire and long-felt need to simplify and effectively coalesce the plurality of overlapping "texting" communications systems. This is also especially true in cross platform and cross provider conditions. Further, support of legacy devices will be well received by consumers.

One problematic aspect of traditional messaging environments includes poorly scaled messaging content such as pictures, maps, websites, etc. This is especially true under the constraints of limited display area on many modern mobile devices. Frequently, where content is received on traditional mobile devices, the content arrives by way of a separate protocol that must be separately navigated to. Once a user has navigated to access the content, this content can be poorly scaled such that a user can be required to pan and scroll to view portions of the extents of the content. Even where systems scale the content to fit within the content display pane of a mobile device, such content is frequently not in the context of a threaded message body. Moreover, in conventional systems, content, once scaled, is generally not resealed in a dynamic manner. Clearly there is still much room for improvement in managing presentation of content in messaging and threaded messaging conversations.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The claimed subject matter provides for dynamic scaling of messaging content. Messaging content can include visual content other than the actual textual content of a message body. In an aspect dynamic scaling of messaging content can allow message content such as pictures, images, emoticons, movies, maps, and the like to be presented to a user in a manner that facilities efficient comprehension of the message content and is visually appealing.

As used herein, a messaging environment can include "text" messages (e.g., short messaging service (SMS) messages, multimedia messaging system (MMS) messages, instant messaging (IM) type messages, IP messages, email messages, video snippets, voice snippets, web snippets, twitters, emoticons, etc.), more especially in a mobile device environment. Similarly a threaded messaging environment can be the same as or similar to a messaging environment and further include threading of messages (e.g., individual messages are threaded or strung together to provide additional context to the messages.) While the list of particular communications protocols herein is non-exhaustive, it is intended to convey that the connotation of "texting" incorporates messages of conversational length, including referenced media type objects, exclusive of pure traditional voice conversation as in a telephone call (e.g., a traditional telephone call is not "texting" but a SMS string that includes voice snippets can be considered "texting").

In modern messaging environments efficient comprehension is important to users because of the rapid progression of a message conversation or a threaded message conversation. Further, users typically also desire the content to be visually appealing. Dynamic scaling of message content can facilitate scaling content to fit within a designated portion of the display area of a messaging environment in an automatic manner. In another aspect, the scaling of content can be adjusted based on numerous indicators. These indicators can include the type of content, the position of the content, the original footprint of the content, the relevance of the content, the focus state of the content, available display area, inferences related to the scaling of the content, the presence of other content, the rate of message throughput in a messaging conversation, etc.

More particularly, in an aspect, content can be scaled to facilitate the use of tokens as contextual locators in a messaging environment wherein a focus state indicator can facilitate dynamically resealing content. For example, where a conversation includes three sequential images near in time, a conventional system would typically result in the earlier images scrolling off-display to facilitate display of the more recent image (assuming the images are not small enough to all fit on the display simultaneously). In contrast to such a typical presentation of content from a conventional system, dynamic scaling can, for example, employ an icon (a first token) for the earliest image, a thumbnail (a second token) for the second image, and a full image (a third token) for the most recent image. This can result in all three images (or scaled representations thereof) to be displayed simultaneously to provide greater context for a user. Further for example, the user can scroll back to the earlier tokens, and in response, the tokens can dynamically be scaled in response to the changing focus state. For example, as the second token transitions into the focus state, it can be displayed as a full image (e.g., dynamically scaled up from a thumbnail to a full image) while the first and third tokens can dynamically be scaled to icons (e.g., the earliest token can remain an icon and the most recent token can be scaled down from a full image to an icon).

Certain illustrative aspects of the disclosed innovation are described herein in connection with the following description and the annexed drawings. These aspects are indicative, however, of but a few of the various ways in which the principles disclosed herein can be employed.

DETAILED DESCRIPTION

Figure 1:
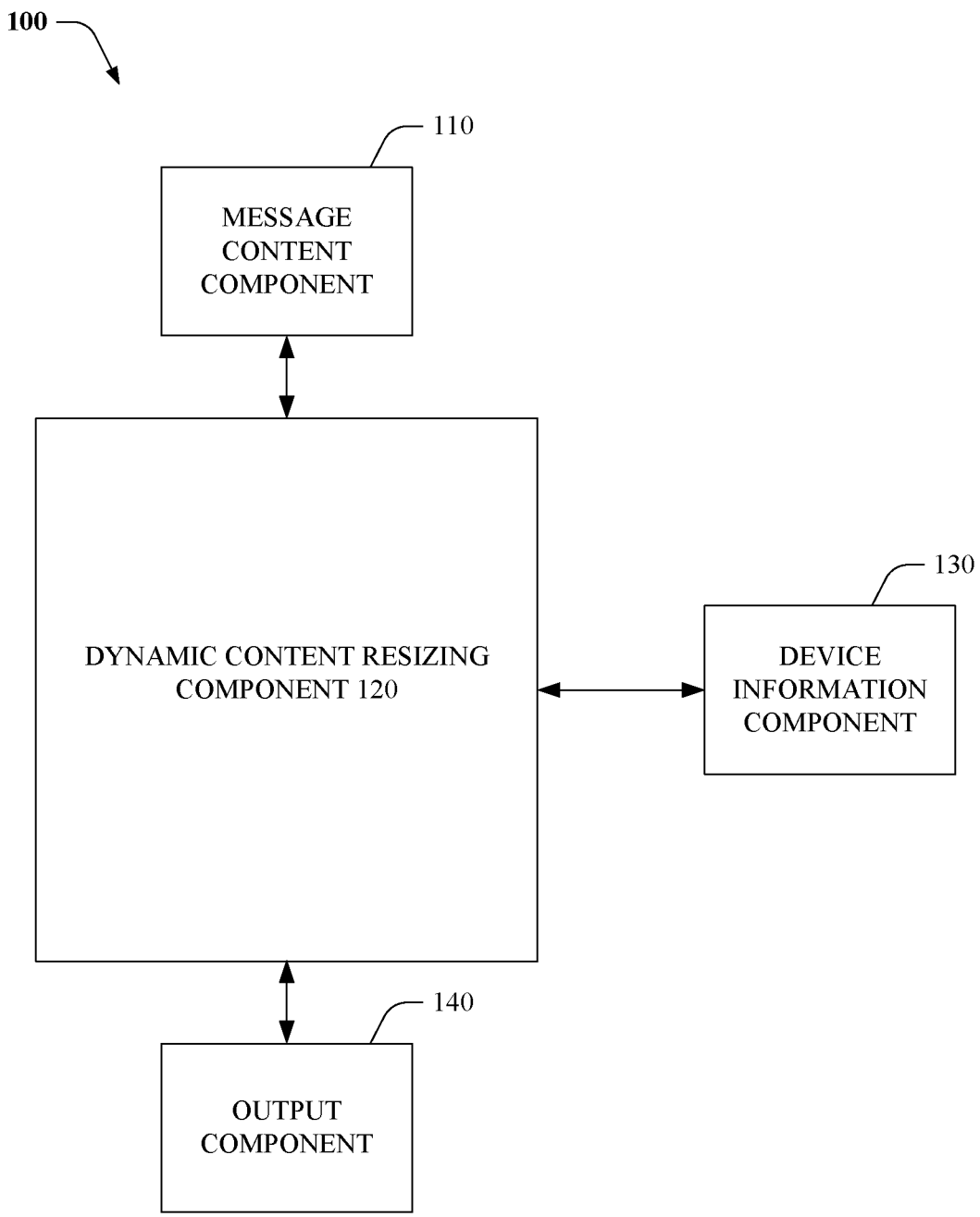
FIG. 1 illustrates an exemplary system that facilitates dynamic scaling of messaging content in accord with aspects of the claimed subject matter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It will be appreciated by one of skill in the art that a communication network for systems described herein can include any suitable mobile and/or landline based circuit-switched communication network including a GSM network, a time division multiple access (TDMA) network, a CDMA network, such as IS-95 and subsequent iterations of CDMA technology, an integrated digital enhanced network (iDEN) network and a public switched transport network (PSTN). Further examples of a communication network can include any suitable data packet-switched or combination data packet/circuit-switched communication network, e.g., a wired or wireless internet protocol (IP) network such as a voice over internet protocol (VoIP) network, an IP data network, a universal mobile telecommunication system (UMTS) network, a general packet radio service (GPRS) network, and other communication networks that provide streaming data communication over IP and/or simultaneous voice and data communication over combination data packet/circuit-switched technologies.

Similarly, one of skill in the art will appreciate that a communication device for systems disclosed herein can include a mobile device, mobile phone, a PSTN phone, a cellular communication device, a cellular phone, a satellite communication device, a satellite phone, a VoIP phone, a WiFi phone, a dual-mode cellular/WiFi phone, a combination cellular/VoIP/WiFi/WiMAX phone or any suitable combination thereof. Specific examples of a mobile device can include cellular devices such as GSM, TDMA, CDMA, IS-95 and iDEN phones and cellular/WiFi devices such as dual-mode GSM, TDMA, IS-95 or iDEN/VoIP phones, UMTS phones UMTS VoIP phones, or like devices or combinations thereof. In support of mobile devices a gateway routing component of such a system can include any suitable component that can perform centralized routing within a mobile, satellite, or similar network (but optionally does not include components that route strictly within a PSTN network), routing between communication networks, between networks of varying architecture (e.g., between PSTN, GSM, UMTS, Enterprise VoIP, the Internet, or combinations thereof), or the like. Specific examples of a gateway routing component can include a GMSC, a gateway GPRS support node (GGSN), a session border control (SBC) device, or like devices. Additionally, a data storage component of such a system can include any suitable device, process, combination device and process, etc., that can store digital and/or switched information (e.g., server, database, data store, or the like).

As used herein, a messaging environment can include "text" messages (e.g., short messaging service (SMS) messages, multimedia messaging system (MMS) messages, instant messaging (IM) type messages, IP messages, email messages, video snippets, voice snippets, web snippets, twitters, emoticons, etc.), more especially in a mobile device environment. Similarly a threaded messaging environment can be the same as or similar to a messaging environment and further include threading of messages (e.g., individual messages are threaded or strung together to provide additional context to the messages.) While the list of particular communications protocols herein is non-exhaustive, it is intended to convey that the connotation of "texting" incorporates messages of conversational length, including referenced media type objects, exclusive of pure traditional voice conversation as in a telephone call (e.g., a traditional telephone call is not "texting" but a SMS string that includes MMS content, maps, movies, and the like can be considered "texting"). Further, a unified messaging environment is an environment wherein features commonly associated with "texting" protocols coalesce into a single messaging environment, whether or not such an environment employs any particular protocol associated with said feature(s).

FIG. 1 depicts an exemplary system 100 that facilitates dynamic scaling of messaging content in accord with aspects of the claimed subject matter. System 100 can include message content component 110. Message content component 110 can access message content related to a message of a messaging conversation environment. Messaging content can include visual content other than actual textual content of a message body. In an aspect dynamic scaling of messaging content can allow message content such as pictures, images, emoticons, movies, maps, and the like to be presented to a user in a manner that facilities efficient comprehension of the message content and is visually appealing. Messaging content can further include visual representations of non-visual content, for example, icons or tokens that represent a visual placeholder for non-visual content such as music, voice, audio, textures or other tactile sensations, scents, tastes, etc. Messaging content component 110 can be communicatively coupled to dynamic content resizing component (DCRC) 120.

System 100 can further included DCRC 120. DCRC 120 can facilitate dynamically scaling message content (e.g., visual content or visual representations of non-visual content other than textual content of a message body). Dynamic scaling can advantageously facilitate efficient comprehension of message content. Efficient comprehension of message content can be important to users of messaging communications environments. This can be especially true in mobile messaging environments where display area is typically limited.

Dynamic scaling of message content generally includes adapting message content to a set of parameters related to the messaging environment. These parameters can be related to physical display parameters, to the user or user preferences, to message body content, to the presence of other message content, to contextual inferences, or other parameters deemed relevant to appropriate scaling of message content. In an aspect, dynamic scaling of message content can employ message content tokens. These tokens can be scaled images related to the message content. For example, a token can be a small icon, a textual representation (e.g., metadata text), a medium icon, a small thumbnail, a large thumbnail, a small image, a full image, an enlarged image, or any other visual representative visual placeholder that at least in part reflects an aspect of the message content.

In a more particular example, where a messaging environment contextually has two instances of the same message content (e.g., the same image is "texted" twice in a threaded message) the first instance can be dynamically scaled to a thumbnail image while the second instance can be dynamically scaled to a full display width image of the content. This exemplary dynamic scaling can facilitate both tokens being contemporaneously displayed to provide the user with additional context in the messaging environment.

Continuing the example, as a third message content (e.g., a map) is placed in the message environment, the first instance can be dynamically scaled to a textual representation of the image, the second instance can be dynamically scaled to a thumbnail of the image, and the new map instance can be dynamically scaled to a quarter-scale image. This exemplary dynamic scaling can facilitate displaying all three message contents simultaneously (e.g., as a mix of text, thumbnails, and reduced images).

Expanding on this particular example, where a user desires to view the second instance of the first message content, the user can scroll back to the second instance, tap on the second instance with a stylus, etc. (e.g., indicate that the second instance should transition into a focused state). In response, the second instance of the message content can be dynamically scaled to a full display width image, the first instance can remain as a textual token and the map image can be dynamically scaled to a textual image to facilitate displaying all three tokens simultaneously. Further, where parameters indicate a preference for two displayed tokens, the first or third token could be scrolled off-display and the token sizes of the remaining two tokens dynamically adapted to facilitate efficient comprehension of the messaging content.

System 100 can further include a device information component 130. Device information component 130 can facilitate access to device or device environment specific parameter information. For example, device information component 130 can source display size information, device battery conditions, device environmental conditions (e.g., temperature, movement, ambient light, etc.), device display capacities (e.g., processor speed, memory capacity, screen resolution, color resolution, etc.) display allocations (e.g., portions of display actually allocated to display content, such as in a windowed display environment), and the like. Device information component 130 can be communicatively coupled to DCRC 120. In an aspect this can facilitate remote or distributed DCRCs, that can further enable legacy device support. For example, a DCRC 120 can be located remote to a mobile device, and device information component 130 can transmit device information to the DCRC in response to related parameters. The DCRC can in response communicate dynamic scaling instructions to the device to facilitate dynamic scaling of message content in a messaging communication environment.

System 100 can further include an output component 140 communicatively coupled to DCRC 120. Output component 140 can facilitate presenting dynamically scaled messaging content for user consumption. In an aspect, output component 140 can facilitate recombining message body content (e.g., textual message information) with dynamically scaled message content. For example, where a message is received with a 200 px by 200 px image and the text "Hello world!", the image can be dynamically enlarged into a token that fits a display width of 240 px (e.g., a 320 px by 240 px display) by DCRC 120. This token can be communicated to output component 140 that can facilitate displaying the 240 px×240 px token with the text "Hello world!" on a mobile device in a threaded messaging environment.

In an aspect, dynamic scaling of message content can facilitate tokens to provide additional context in a messaging environment. Further, these tokens can be scaled to achieve a desired contextual threshold. For example, the contextual threshold can be related to a parameter indicating that at least 20 rows of content be displayed for a particular device display (e.g., 20 lines of messaging text should be displayed for sufficient context). Where the exemplary display can display 100 rows, tokens can consume up to 80 rows such that at least 20 rows remain for message body information. In this example, an image can be dynamically scaled to 80 rows such that 20 rows of text remain displayed. As second image is received, the first image can be scaled to 30 rows, the second image to 50 rows and 20 rows of text can remain displayed. As more text arrives, the images can be further scaled to 20 rows each (e.g., where the images are no longer of focus state) leaving 60 rows of text displayed. In a more extreme extension of this particular example, the images can be scaled to a single row token (e.g., a single row of image metadata text, a single row-height icon, etc.) leaving 98 rows available for text display. One of skill in the art will appreciate that dynamic scaling can facilitate highly adaptable contextual messaging environments, and that all such permutations are within the scope of the disclosed subject matter.

In another aspect, dynamical scaling of message content can be at least in part related to focus state parameters. As a focus state changes, tokens can be dynamically adapted to accommodate the changed focal state. For example, as a user scrolls back in time through a threaded message with a plurality of message content therein, the changing focal state can trigger dynamic resizing of the message content as it comes into focus and again as it goes out of focus.

Further, a temporal scroll parameter can alter the degree of dynamic scaling based, for example, on the rapidity with which the user is changing focal state. In an example, as a user scrolls back across a thread of image tokens, the instant in focus image can "grow" to 25% of display area, image tokens adjacent to the focus image can "grow" to 10% of display area, and all other tokens can be single row tokens. Thus, in this example, as the user "rolls-back" through the threaded tokens, they will appear to "grow" form a single row token, to a 10% token, to a 25%, then "shrink" to a 10% token as the focus moves past them, then again to a single row token. Expanding on this example, where a user scrolls more slowly through the same set of tokens, it can be inferred that the user is "more focused" on tokens as they "roll by". In response to the heightened attentiveness, the scaling can be 40% for a focal token and 20% for focal adjacent tokens. One of skill in the art will appreciate that the disclosed subject matter can be adapted to a plurality of perceived optimal combinations of dynamic scaling and that all such adaptations are within the scope of the present disclosure.

Additional parameters can be associated with dynamic scaling of message content. For example, where a device is in a dark environment (e.g., it is night time, the device is in a dimly lit room, etc.) dynamic scaling can be adjusted to smaller tokens where the darker conditions facilitate improved visual acuity of a display. Similarly, where the device is, for example, in bright sunlight, larger tokens can be employed given that it can be harder to see image details in brighter light environments for some displays.

As another example of a parameter, dynamic scaling can be based on a message content type parameter. For example, map message content can be scaled so that a user can pan and scroll the map token when the token is in focus (e.g., to provide a high level of detail the token can be larger than the display, etc.) and scaled to a small icon when not in focus because little useful information can be gleaned form the map token in an intermediate token size (e.g., the map is only useful in a large size, so no intermediate sizes are employed and the token is very small when not in focus and very large when in focus). The map example can be contrasted with an example of an image token, such as an animated GIF emoticon, which can convey information at nearly any token scaling. As such, the exemplary animated GIF token can transition all levels of dynamic scaling as defined for the system.

One of skill in the art will appreciate that not every possible parameter and the associated dynamic scaling schema can be expressly incorporated herein and as such will appreciate that all such dynamic scaling schema and related parameters are contemplated to be within the scope of the presently disclosed subject matter. Dynamic scaling of message content can be adapted to facilitate efficient comprehension of messaging content in highly fluid messaging communication environments. This is especially true in messaging communication environments having limited display areas. Where a unified messaging environments exists, for example, on a mobile device, "texting" with inline images and the like in a threaded manner among a plurality of conversants can result in large amounts of visual information being rapidly presented on a diminutive display. Dynamic scaling of the visual content can increase display time of message body text by adaptively and dynamically scaling visual content, for example as a function of user focus, among numerous other parameters. Clearly, dynamic scaling of message content is advantageous in such systems and devices.

Figure 2:
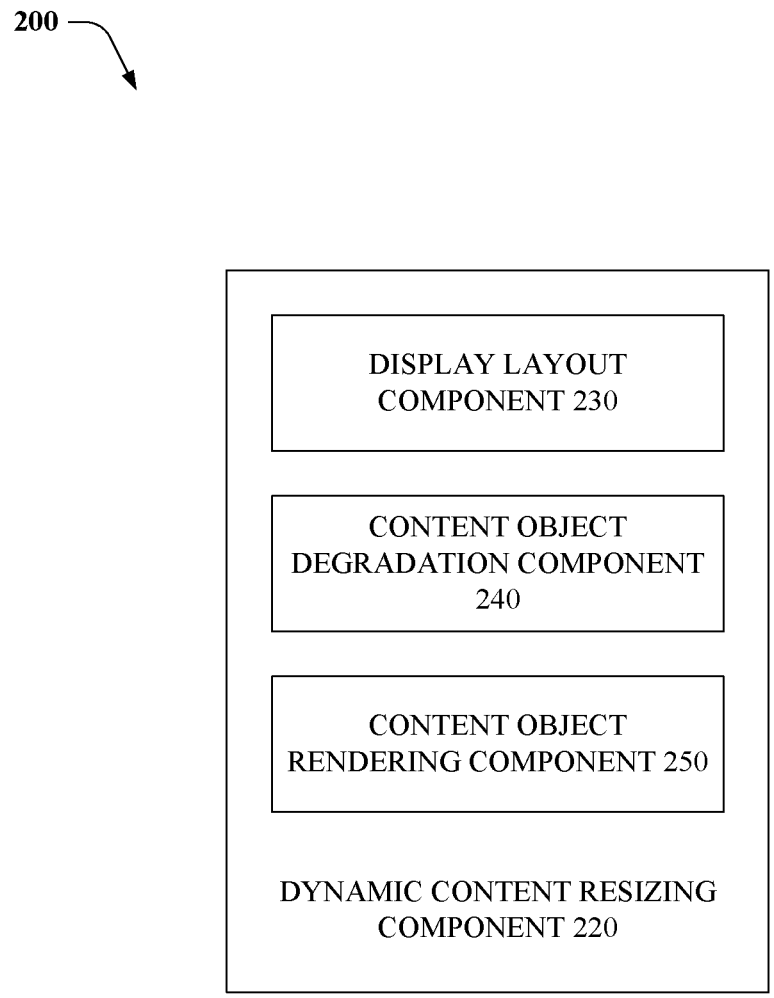
FIG. 2 depicts an exemplary system that facilitates dynamic scaling of messaging content in accord with aspects of the claimed subject matter.

FIG. 2 depicts an exemplary system 200 that facilitates dynamic scaling of messaging content in accord with aspects of the claimed subject matter. System 200 can include a DCRC 220. DCRC 220 can be the same as, or similar to, DCRC 120. In an aspect, DCRC 220 can be local to a device or system. In another aspect, DCRC 220 can be remote form a system or device or can be adapted to a distributed computing environment. For example, DCRC 220 can be embodied in an ASIC of a mobile phone, can exist on a server, or can be a tool in a cloud environment.

DCRC 220 of system 200 can further include display layout component 230. Display layout component 230 can at least in part define a layout schema for display areas associated with dynamic scaling of message content, as disclosed herein. For example, where a display is a windowed display, a particular window can have parameters associated therewith that are reflected in dynamic scaling of message content displayed within the particular window. As such, the effect of these parameters can be accounted for in one or more display layouts computed by display layout component 230. The computed layouts can be incorporated into any dynamic scaling schema effected for message content dynamically scaled by way of DCRC 220.

System 200 can further include a content object degradation component 240. Content object degradation component 240, can facilitate degrading message content for token representation. For example, where a 500 px by 480 px image is accessed by way of a message of the messaging environment, the image can be represented as a dynamically scalable token, as disclosed herein. For example, the image can be degraded, by content object degradation component 240, to a 50 px by 48 px token, a 20 px by 20 px icon, a single row textual token (e.g., text mined form image metadata), etc. In a related aspect, degradation of visual content to textual representations (e.g., text tokens) can be related to mining metadata. For example, a map message content object such as a map of Trinidad can be degraded to "<Trinidad Map>", "<Map of Island>", "<Map>", or any other relevant textual token. Similarly, a picture tagged with metadata related to the image content can be mined to provide a textual token. These processes can be facilitated by way of content object degradation component 240.

System 200 can further include content object rendering component 250. In an aspect, content object rendering component 250 can facilitate rendering of dynamically scaled message content. This can further occur in some instances in conjunction with the processing of display layout component 230, content object degradation component 240, or combinations thereof. For example, content object rendering component 250 can facilitate rendering of one or more message content tokens and facilitate the dynamic scaling thereof.

In an exemplary embodiment, a movie-type message content can be received. Display layout component 230 can allocate 25% of the display area for rendering of a movie token. Content object degradation component 240 can degrade the movie message content to fit with the designated 25% of display area. Content object rendering component 250 can then facilitate rendering the 25% movie token on a device display associated with DCRC 220. It will be obvious to one of skill in the art that this is a rudimentary non-limiting example presented only to provide additional clarity with respect to the presently disclosed subject matter and that other less rudimentary example are equally within the scope of the disclosed subject matter.

Figure 3:
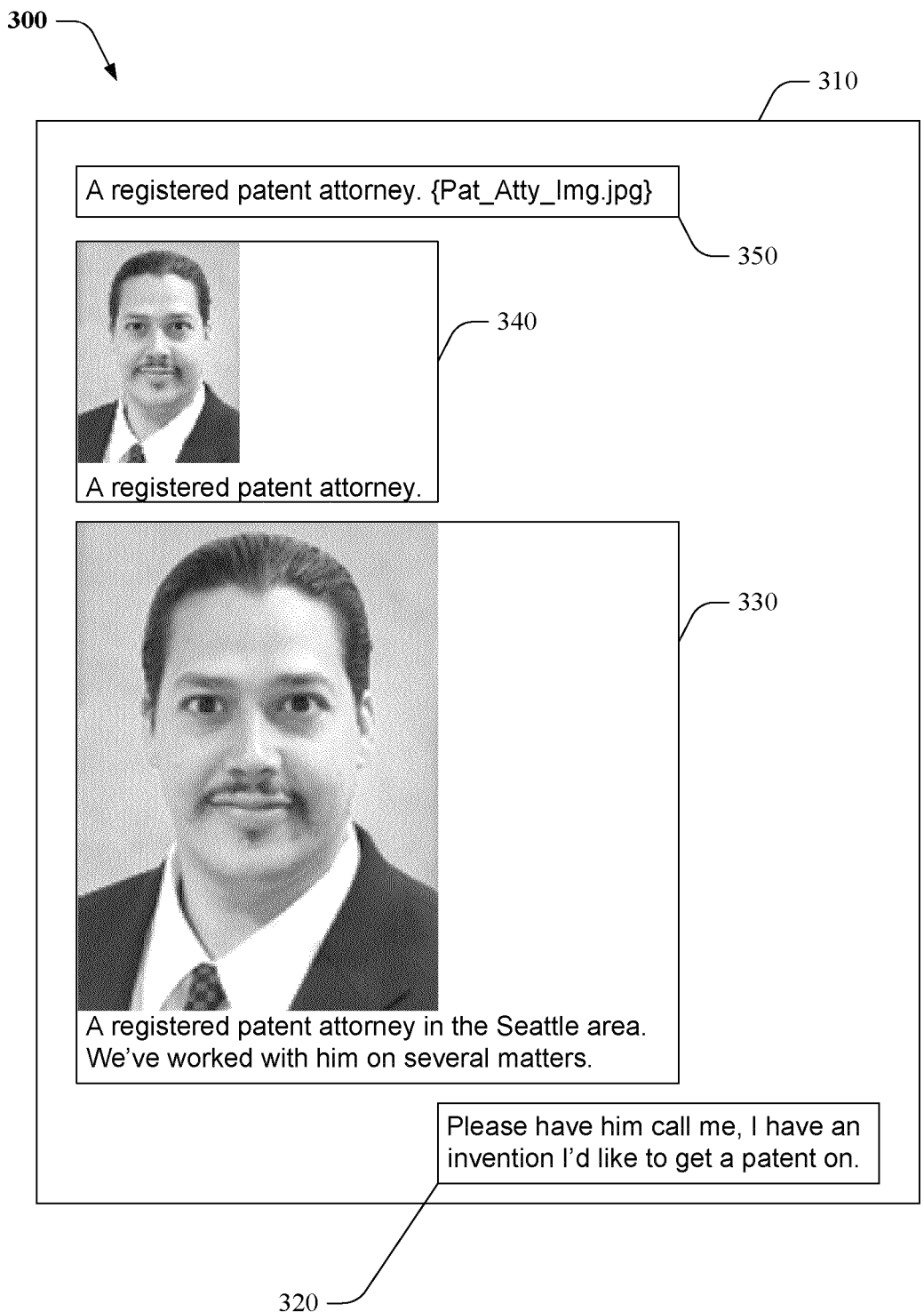
FIG. 3 depicts an exemplary messaging environment that facilitates dynamic scaling of messaging content in accord with aspects of the claimed subject matter.

FIG. 3 depicts an exemplary messaging environment 300 that facilitates dynamic scaling of messaging content in accord with aspects of the claimed subject matter. Within exemplary messaging environment 300, a display area 310 can be defined. As disclosed herein display area 310 can be a display, such as a mobile device display, or portion of a display, such as a window in windowed display environment. In a related aspect, display area 310 typically relates to a physical display area but can also relate to a virtual display area. For example, a virtual display area can be larger than can be physically displayed, such that the physically displayed portion acts as a window of the larger virtual display area.

Display area 310 of exemplary messaging environment 300 can include messaging elements. These messaging elements can include body text (e.g., the text of a message), message boundaries (e.g., boxes, bubbles, colors, etc. denoting the extents of any particular message in the messaging environment), message content (e.g., visual elements of a message other than body text), etc. One of skill in the art will appreciate that messaging environments can include many other specific message elements, and while the particular nature of these elements is outside the scope of the present disclosure, all such elements, as related to dynamic scaling of message content, are within the scope of the herein disclosed subject matter. For ease of explanation, message elements can be discussed in a combined form, for example, message 320 can include body text and a message boundary (e.g., the black rectangular box enclosing the body text). Similarly, message 330 can include body text, degraded message content (e.g., the smaller image) and a message boundary. Message 340 can include body text, message content (e.g., the image) and a message boundary. Message 350 can include body text, message content (e.g., textual token "{Pat_Atty_Img.jpg}") and a message boundary.

In this particular exemplary messaging environment 300, three message content tokens are demonstrated and are intended to represent the same message content in a plurality of degraded forms. At 330, the picture of the man can be a dynamically scaled token of a larger unscaled image of the man (e.g., the message content is the unscaled image represented by the dynamically scaled token image). The token of 330 can be less degraded than the token of 340 and/or 350 where the token of 330 is closer to the focus of a user (assuming the focus is at message 320).

At 340, the image of the man can be a dynamically scaled token of an unscaled image of the man. The token of 340 can be more degraded (e.g., smaller) than the degraded token of message 330 and less degraded (e.g., larger) than the token of message 350. The token at 350 can be a single row textual token of the unscaled image of the man (as disclosed herein).

The token at message 350 can be the most degraded of the three exemplary degraded tokens where it is farthest from the user focus.

In an aspect, the degradation of the tokens from a full size image of the man clearly illustrate that more contextual information can be presented to a user by consuming less of the display area 310 than with an unscaled image. In a more traditional and conventional system that does not dynamically scale content, the messages 340 and 350 would have "rolled off screen" to facilitate display of the unscaled image of the man. Further, even where conventional systems do some initial scaling of an image, this is not the same as dynamic scaling of the image. As such, even an initially scaled image of the man at 340 and 350 would a have at least in part have "rolled off screen" where they are scaled to a similar initial size as the scaled image of message 330. In sharp contrast, to these conventional systems, dynamic scaling of message content facilitates displaying each of message 330, 340 and 350 simultaneously because the image of the man is dynamically scaled (e.g., degraded) as it becomes more removed from the focus of the user. The user has more contextual information available where the three messages (e.g., 330-350) remain visible longer in an active messaging conversation. One of skill in the art will appreciate that this rudimentary exemplary messaging environment is not intended to be limiting and is merely presented to illustrate certain particular aspects of the subject disclosures without any intended limitation to other aspects of the subject disclosure.

Figure 4:
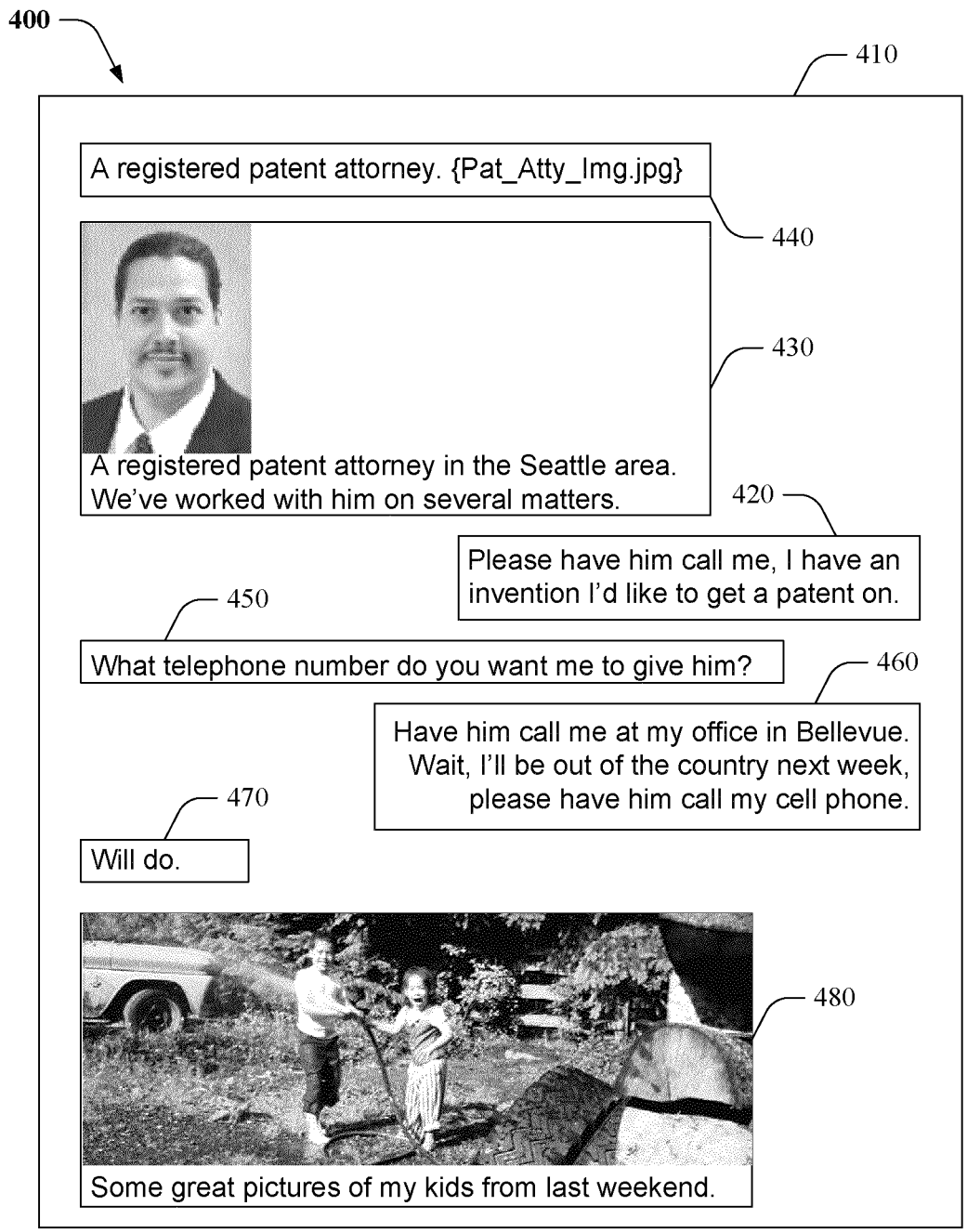
FIG. 4 illustrates an exemplary messaging environment that facilitates dynamic scaling of messaging content in accord with aspects of the claimed subject matter.

FIG. 4 depicts another exemplary messaging environment 400 that facilitates dynamic scaling of messaging content in accord with aspects of the claimed subject matter. Exemplary messaging environment 400 can include display area 410. Display area 410 can be the same as, or similar to, display are 310. Exemplary messaging environment 400 can be a depiction of display area 310 at a later time within the exemplary messaging conversation. As such, message 440, 430 and 420 can be the same as, or similar to, message 340, 330 and 320 respectively (e.g., message 350 can have "rolled off screen" in exemplary messaging environment 400). Further, message 450, 460, 470, and 480 can be new messages occurring within exemplary messaging environment 400.

At 480, a dynamically scaled message content is depicted (e.g., a scaled token of an image of a two children). It will be apparent that the image of message 430 can have been dynamically scaled to a more degraded scale (e.g., smaller than it was at an earlier time, for example at message 330 of exemplary messaging environment 300). Similarly, the token of message 440 can be degraded to a textual token of the image of the man.

Exemplary messaging environment 400 illustrates that the tokens can be dynamically scaled as a messaging environment develops over time. In an aspect this can facilitate maintaining a high level of user context as compared to including unscaled images or images that are only initially scaled. As is apparent, display are 410 communicates both the text of a message and presents a token of message content to a user allowing them to more fully and efficiently comprehend the scope and meaning of the message and the context of the message (e.g., how the message relates to other proximal messages).

Figure 5:
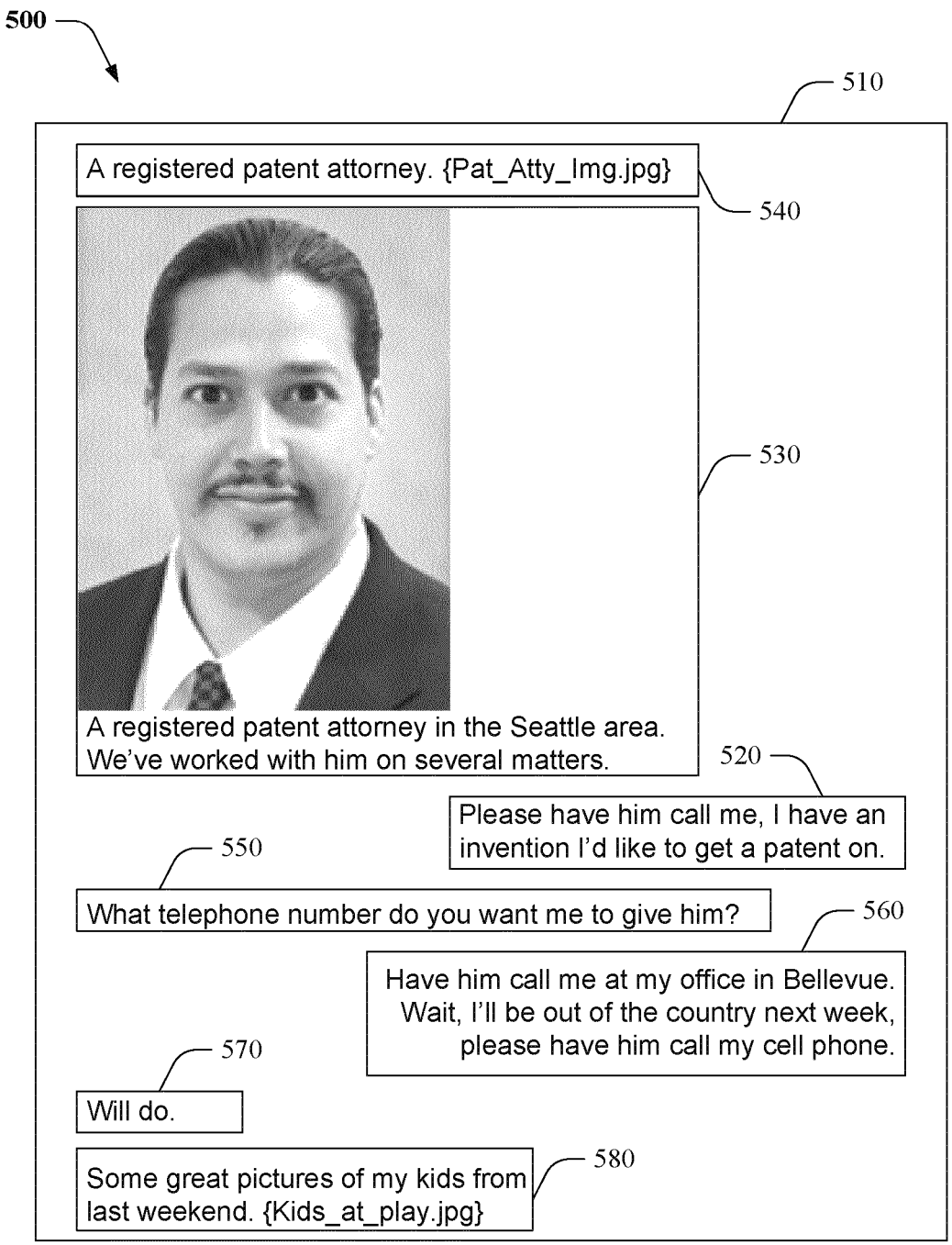
FIG. 5 illustrates an exemplary messaging environment that facilitates dynamic scaling of messaging content in accord with aspects of the claimed subject matter.

FIG. 5 depicts an exemplary messaging environment 500 that facilitates dynamic scaling of messaging content in accord with aspects of the claimed subject matter. Exemplary messaging environment 500 can include display are 510. Display area 510 can be the same as, or similar to, display areas 310 and 410. Exemplary messaging environment 500 can be a depiction of display area 310 and 410 at a still later time within the exemplary messaging conversation. As such, message 540, 530 and 520 can be the same as, or similar to, message 340/440, 330/430 and 320/420 respectively. Further, message 550, 560, 570, and 580 can be the same as, or similar to, message 450, 460, 470 and 480 within exemplary messaging environment 400 respectively.

Exemplary messaging environment 500 is intended to illustrate dynamic scaling with changing focal condition within a messaging environment. Where a user scrolls up to an earlier message of the threaded messages of exemplary messaging environment 500, the focal state can be altered. This altered focal state can be associated with an aspect of dynamic scaling of message content. The message content token of message 580 can be degraded to a textual token from the image token of 480 in exemplary messaging environment 400 in relation to the user focus moving to a different message (e.g., the user can change focus to message 530).

Where the user focus is associated with message 530, the degraded token of 430 can be "reconstituted" (e.g., dynamically scaled to a larger image representation than associated with the token at 430 of exemplary messaging environment 400). In more conventional systems, as the user scrolls up to see the image of message 530, the image of message 580 would have "rolled off screen" and context would be reduced. Similarly, where the user needed to scroll up to see the image of message 530 in a conventional system, the image of message 540 would not have been on screen either, again representing less user context for the given messaging environment. In contrast to the conventional systems, the presently disclosed messaging environment illustrates higher context in that a token of the images for both message 580 and 540 remain visible to the user in exemplary messaging environment 500. Further, the image of 530 can have been rescaled to provide more detail related to being focused on by a user (e.g., where a user shifted focus from message 580 to message 530 within exemplary messaging environment 500).

One of skill in the art will understand that the example(s) of FIGS. 3-5 can be extended to encompass numerous other types of message content, token sizes, incremental steps between token maxima and minima, magnitudes of token incrementing, inclusion of other relevant parameters, etc. and that all such expressions are within the scope of the herein disclosed subject matter. The present disclosure facilities efficient comprehension within messaging environment by, at least in part, providing high context for messages within the messaging environments. This high context is enabled, at least in part, by employing dynamic scaling of message content (e.g., visual content excluding message body text). Wherein numerous parameters can be employed in determining the particular results of dynamic scaling, the present disclosure provide a very flexible approach to improving usability of messaging environments, particularly those of mobile devices, more especially in unified messaging contexts.

Figure 6:
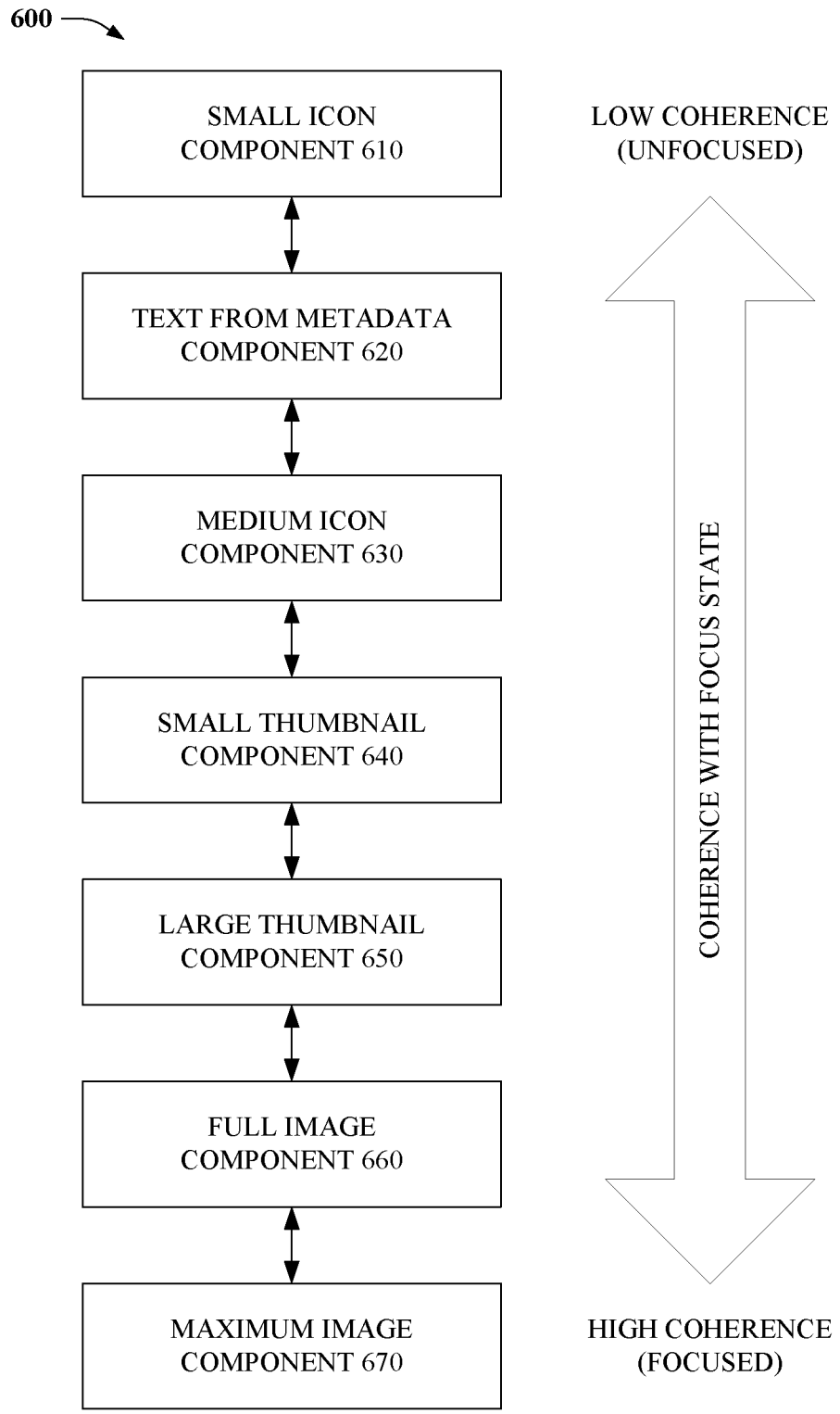
FIG. 6 illustrates an exemplary system for facilitating dynamic scaling of messaging content in accord with aspects of the claimed subject matter.

FIG. 6 depicts an exemplary system 600 facilitating dynamic scaling of messaging content in accord with aspects of the claimed subject matter. System 600 illustrates an exemplary set of incremental scale steps for dynamic scaling message content tokens. A small icon component 610 can facilitate scaling message content from an unscaled representation to a small icon token. A small icon token can be near in size to a single textual character of a messaging environment and within the context of system 600 represents a smaller token size than a textual token (e.g., a string of text).

A text from metadata component 620 can facilitate scaling message content from an unscaled representation to a textual token. A textual token can be larger than a small icon token and smaller than a medium icon token. A textual token can be a single row or multiple row string of text related to the unscaled message content. In an aspect this text string can be mined from metadata associated with the unscaled image. For example, the image of the man in FIG. 3 can be related to metadata indicating that the man is a patent attorney. This information can be mined when generating dynamically scaled textual token similar to that of message 350 of FIG. 3 ("{Pat_Atty_Image.jpg}").

Continuing up the token size scale, System 600 can include medium icon component 630. Medium icon component 630 can generate icon tokens larger than textual tokens and smaller than small thumbnail tokens. Similarly, small thumbnail component 640 can generate tokens larger than medium icon tokens and smaller than large thumbnail tokens. Large thumbnail component 650 can generate tokens larger than a small thumbnail token and smaller than a full image token. Full image component 660 can generate tokens larger than large thumbnail tokens and smaller than maximum image tokens. Maximum image component 670 can generate tokens larger than full image tokens. In an aspect, maximum image component can represent the top of the token generating scale. In another aspect, one of skill in the art will appreciate the system 600 is not so limited where additional token generating components can be included to add larger tokens, smaller tokens, or finer gradations between token. Further one of skill in the art will appreciate that not all gradation of token components of system 600 need be included and that a more course set of gradations can be employed where desired. System 600 merely illustrates one possible set of token gradations.

In another aspect, coherence with focus state can be related to the token scale quantum. As depicted, as tokens near small icon token scale, these tokens can represent message content of low coherence with the user focus state (e.g., message content that is far from focus.) Similarly, as tokens increase in scale (e.g., toward maximum image token scale) these tokens can be related to an increasing focus state (e.g., the larger the token, the closer to a focused state it is). One of skill in the art will appreciate that other factors and parameters can be associated with token scale in lieu of focus state or in addition to focus state and that all such permutations are within the scope of the subject disclosure. The components of system 600 are communicatively coupled to facilitate transitions between tokens generated among the several components thereof and it will be appreciated that degradation and reconstitution can occur without generating tokens at each component of a transition.

Figure 7:
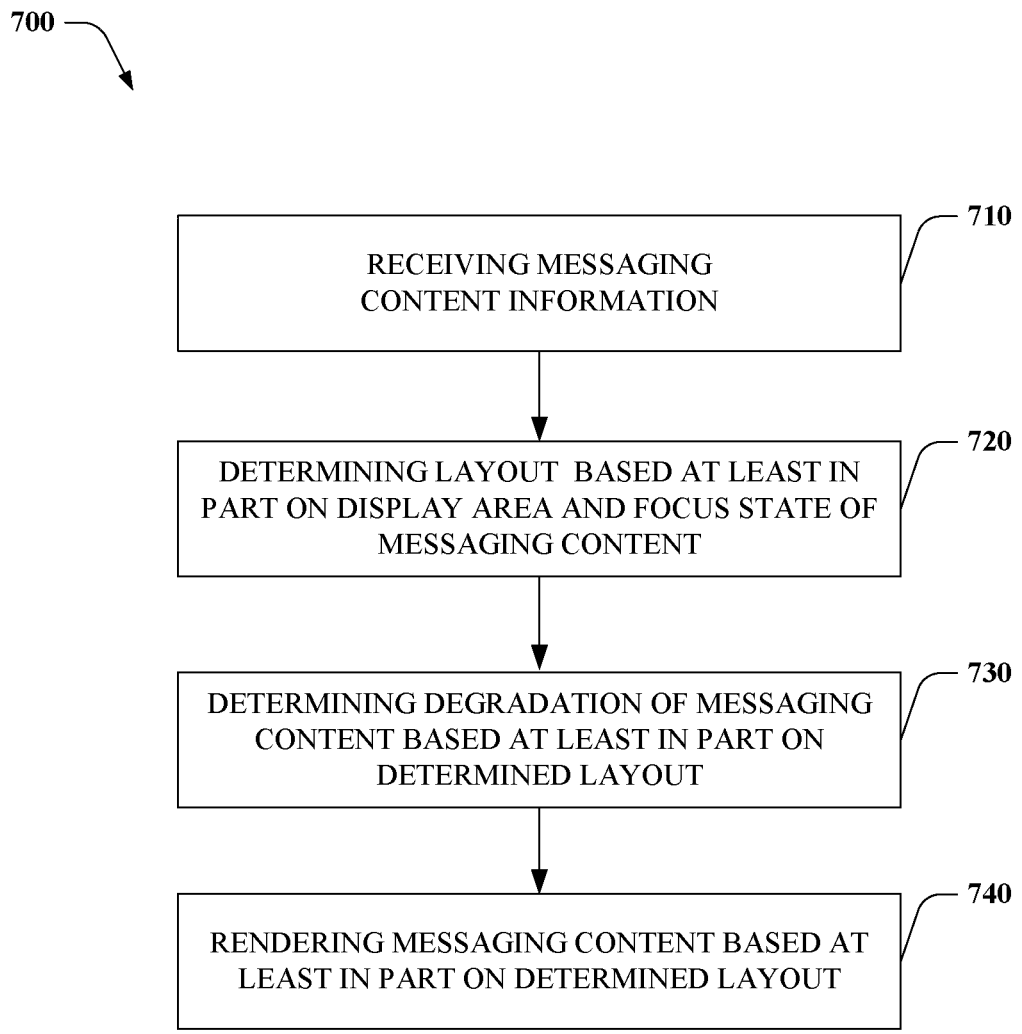
FIG. 7 depicts an exemplary methodology for facilitating dynamic scaling of messaging content in accord with aspects of the claimed subject matter.
Figure 8:
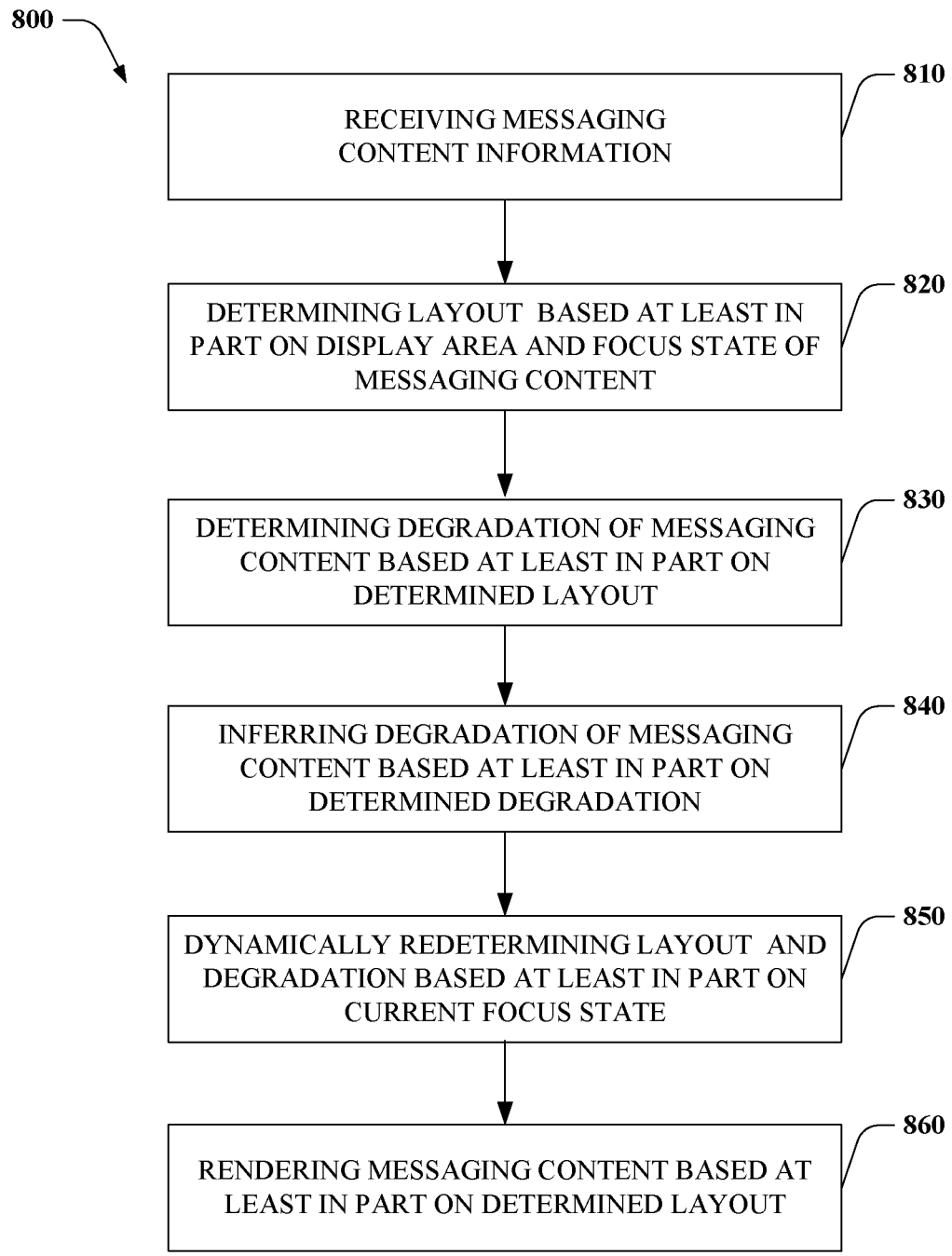
FIG. 8 illustrates an exemplary methodology for facilitating dynamic scaling of messaging content in accord with aspects of the claimed subject matter.

FIGS. 7 and 8 depict exemplary methodologies in accord with the claimed subject matter. While, for purposes of simplicity of explanation, the methodologies are shown and described as a series of acts, it is to be understood and appreciated that the claimed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the claimed subject matter. Additionally, it should be further appreciated that the methodologies disclosed hereinafter and throughout this specification are capable of being stored on an article of manufacture or other computer readable storage medium to facilitate transporting and transferring such methodologies to computers.

FIG. 7 depicts an exemplary methodology 700 facilitating dynamic scaling of messaging content in accord with aspects of the claimed subject matter. At 710, methodology 700 can receive messaging content information. This information can be related to visual content (or visual representations of non-visual content) associated with a message body (including bodies of zero text length) and facilitate generating dynamically scalable tokens as representations of said message content.

At 720, a layout schema can be determined based at least in part on a display area and a focus state of the messaging content. Where a display has a displayable area this and other display parameters can be factored into determination of token scaling. Further, the focus state of the message content can be included in determinations of the token scale for display within the determined displayable area.

At 730, a message content degradation can be determined in relation to generating a dynamically scaled token representing the unscaled message content. This can reflect the display layout determination of block 720

At 740, a message content can be rendered as a token based at least in part on the determined layout and in relation to the degradation determination of block 730. The rendered token can be included in a displayed message also displaying the body text of the message where such text exists. At this point methodology 700 can end.

As will be apparent to one of ordinary skill in the art, methodology 700 discloses a very primal dynamic scaling of message content as disclosed herein. Methodology 700 illustrates a rudimentary determination of scaling an unscaled message content by a token representation that considers the displayable area and the focus state context of a token when rendering the scaled token itself. As will be readily appreciated, when methodology 700 is recursively executed, the token can continually be adapted to changing parameters including focal state. Also to be appreciated by one of skill in the art is that further parametric considerations can be made, including employing inferences and forms of artificial intelligence, to facilitate highly relevant dynamic scaling far more complex but still based in part on methodology 700. All such improvements are within the scope of the disclosed subject matter.

FIG. 8 illustrates an exemplary methodology 800 facilitating dynamic scaling of messaging content in accord with aspects of the claimed subject matter. At 810 message content information can be received. At 820 a layout can be determined, being based at least in part on display area and focus state. At 830, a level of degradation can be determined for the messaging content based at least in part on the determined layout of 820. At 840, inferences can be applied to the degradation determinations of 830. These inferences can be related to additional parameters as disclosed herein, for example including user preferences, user history, an inferred optimal visual size in relation to the available display area, etc.

At 850, in response to changes in a focus state, the layout can be dynamically redetermined. At 860, tokens representing the degraded message content can be rendered for the determined layout of block 850. Thus, as the layout is analyzed in relation to changing focal states, the area allocated for individual tokens can be altered. This can accommodate optimizing the layout and associated dynamically scaled tokens to attain desired levels of efficiency in user comprehension. These schemata can be adapted to adjustments of just what is optimally efficient comprehension for specific devices, environments, users, etc. For example, what is optimal for a 5th grade student can be different from what is optimal for a NASA astronaut. At this point methodology 800 can end.

Figure 9:
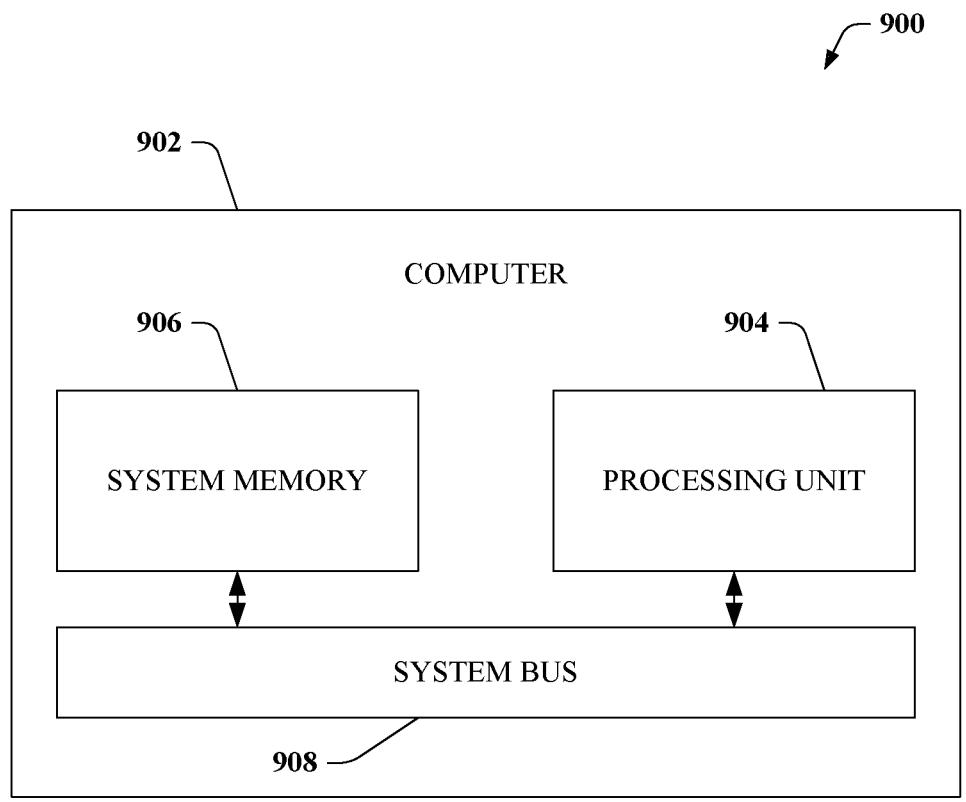
FIG. 9 illustrates a sample operating environment that can determine and store information related to a missed call in accord with aspects of the claimed subject matter.

In order to provide additional context for various aspects of the claimed subject matter, FIG. 9 and the following discussion are intended to provide a brief, general description of a suitable computing environment 900 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors, such a single core processor, a multi-core processor, or any other suitable arrangement of processors. The system bus 908 can be any of several types of bus structure that can further interconnect to a memory bus (with or without a memory controller), a peripheral bus, and a local bus using any of a variety of commercially available bus architectures. The system memory 906 can include read-only memory (ROM), random access memory (RAM), high-speed RAM (such as static RAM), EPROM, EEPROM, and/or the like. Additionally or alternatively, the computer 902 can include a hard disk drive, upon which program instructions, data, and the like can be retained. Moreover, removable data storage can be associated with the computer 902. Hard disk drives, removable media, computer-readable storage media, etc. can be communicatively coupled to the processing unit 904 by way of the system bus 908.

The system memory 906 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 902 through one or more wired/wireless input devices, such as a keyboard, pointing and clicking mechanism, pressure sensitive screen, microphone, joystick, stylus pen, etc. A monitor or other type of interface can also be connected to the system bus 908.

The computer 902 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 902 can connect to other devices/networks by way of antenna, port, network interface adaptor, wireless access point, modem, and/or the like.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 10:
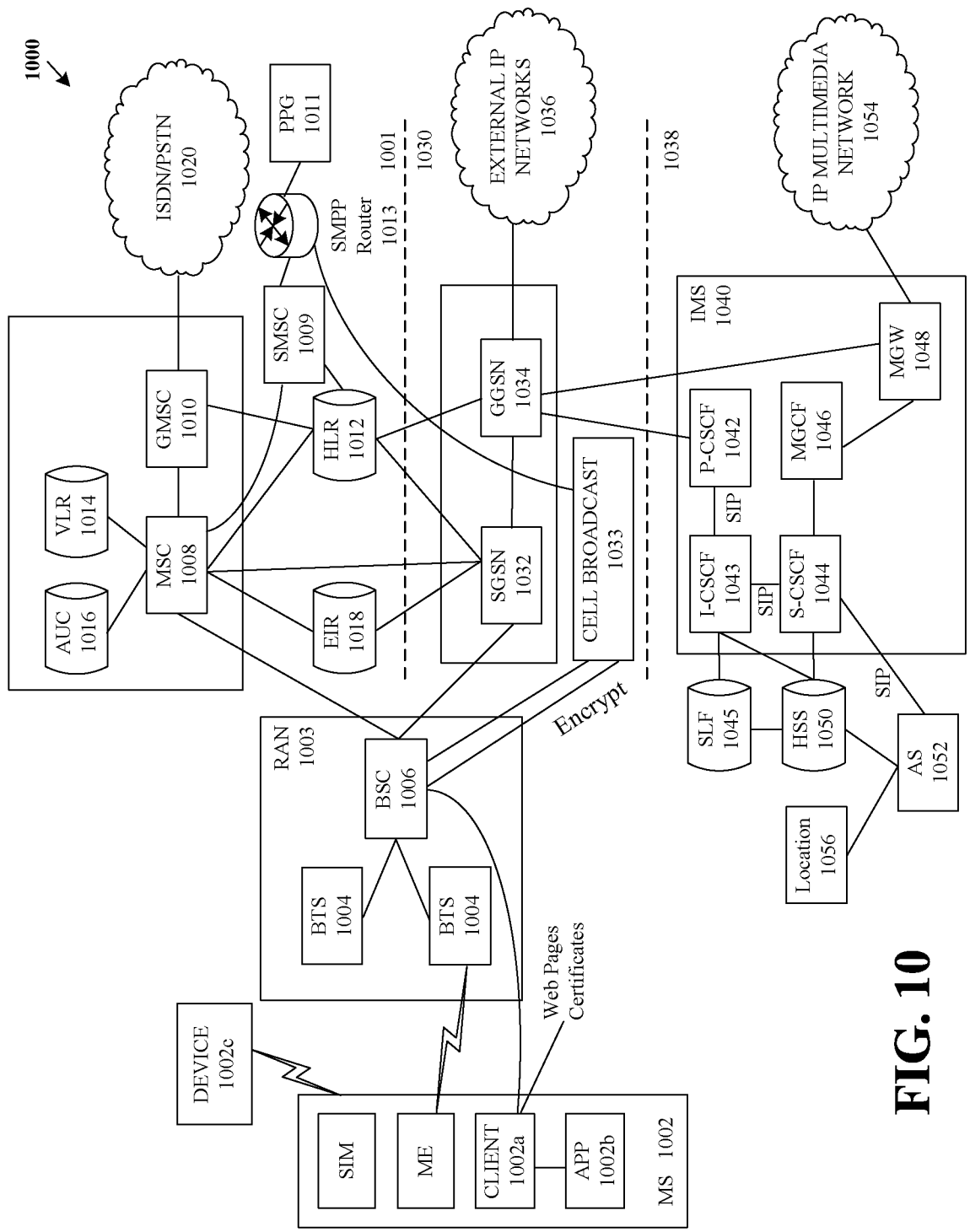
FIG. 10 depicts a sample network-environment for effectuating mobile communication in accord with aspects of the subject innovation.

Now turning to FIG. 10, such figure depicts a GSM/GPRS/IP multimedia network architecture 1000 that includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a can be implemented in JAVA and is discuss more fully below.

The embedded client 1002a communicates with an application 1002b that provides services and/or information to an end user. One example of the application can be navigation software that provides near real-time traffic information that is received via the embedded client 1002a to the end user. The navigation software can provide road conditions, suggest alternate routes, etc. based on the location of the MS 1002. Those of ordinary skill in the art understand that there are many different methods and systems of locating an MS 1002.

Alternatively, the MS 1002 and a device 1002c can be enabled to communicate via a short-range wireless communication link, such as Bluetooth™. For example, a Bluetooth™ SIM Access Profile can be provided in an automobile (e.g., device 1002c) that communicates with the SIM in the MS 1002 to enable the automobile's communications system to pull information from the MS 1002. The Bluetooth™ communication system in the vehicle becomes an "embedded phone" that employs an antenna associated with the automobile. The result is improved reception of calls made in the vehicle. As one of ordinary skill in the art would recognize, an automobile is one example of the device 1002c. There can be an endless number of devices 1002c that use the SIM within the MS 1002 to provide services, information, data, audio, video, etc. to end users.

The BTS 1004 is physical equipment, such as a radio tower, that enables a radio interface to communicate with the MS. Each BTS can serve more than one MS. The BSC 1006 manages radio resources, including the BTS. The BSC can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP)

context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory to store executable instructions; and
a processor, coupled to the memory, that facilitates execution of the executable instructions to perform operations, comprising:
receiving device information comprising environmental condition information related to an environment comprising a mobile device;
determining a current scale level for a scalable visual representation of a message element, the current scale level determined from a scale set comprising a text only scale associated with generating a textual representation of the message element, an icon only scale associated with generating an icon representation of the message element, a reduced image scale associated with generating a smaller representation than a 100% sized representation of the message element, a full size image scale associated with generating the 100% sized representation of the message element, and an enlarged image scale associated with generating a greater representation than the 100% sized representation of the message element;
determining a greater scale level for the scalable visual representation of the message element from the scale set based on the device information and the scalable visual representation being determined to be associated with a first display area;
generating the scalable visual representation of the message element at the greater scale level;
determining another greater scale level for the scalable visual representation of the message element from the scale set based on the device information and in response to the scalable visual representation being determined to be associated with another display area associated with the other greater scale level than the first display area;
generating the scalable visual representation of the message element at the other greater scale level; and
determining a layout of a message comprising a position of body text information within a message display area and a position of the scalable visual representation of the message element within the message display area, wherein the layout comprises the position of the scalable visual representation of the message element not overlapping the position of the body text information.

2. The system of claim 1, wherein the operations further comprise:
receiving information related to display information of the mobile device; and
determining a current active portion of the message display area of the messaging environment.

3. The system of claim 2, wherein generating the scalable visual representation at the other greater scale level is in response to a change in the current active portion of the message display area of the messaging environment.

4. The system of claim 1, wherein the generating the scalable visual representation at the other greater scale level is in response to moving the scalable visual representation to the other display area of the messaging environment.

5. The system of claim 3, wherein the generating the scalable visual representation at the other greater scale level is in response to moving the scalable visual representation to the other display area of the messaging environment and in response to a change in the current active portion of the message display area of the messaging environment.

6. The system of claim 1, wherein the receiving device information further comprises receiving ambient light information.

7. The system of claim 1, wherein the message display area of a messaging environment of the mobile device displays a rendering of the message corresponding to the layout of the message, and wherein the rendering comprises the body text information and the scalable visual representation.

8. The system of claim 7, wherein the message display area of the messaging environment displays a plurality of rendered messages, wherein a first rendered message of the plurality of rendered messages comprises the scalable visual representation, and the current scale of the scalable visual representation relates to a proximity of the first rendered message to a second rendered message of the plurality of rendered messages that is a current focus of the message display area of the messaging environment.

9. The system of claim 8, wherein the scalable visual representation is scaled from the current scale to the other greater scale in response to a determination that a transition of the current focus of the message display area of the messaging environment has occurred from the first rendered message to the second rendered message.

10. The system of claim 9, wherein the scalable visual representation is scaled from the other greater scale to the greater scale in response to a determination that a transition of the current focus of the message display area of the messaging environment has occurred from the first rendered message to a third rendered message.

11. The system of claim 9, wherein a magnitude of the other greater scale level of the scalable visual representation is based on a rate of change in the transition of the current focus of the messaging display area.

12. The system of claim 11, wherein the magnitude of the other greater scale level of the scalable visual representation is increased in response to an increase of the rate of change in the transition of the current focus.

13. The system of claim 1, wherein the receiving device information further comprises receiving movement information related to movement of the mobile device.

14. The system of claim 1, wherein the receiving device information further comprises receiving battery information related to a battery of the mobile device.

15. The system of claim 1, wherein the receiving device information further comprises receiving information related to an available display area of the mobile device.

16. The system of claim 1, wherein the text only scale of the scale set is associated with generating a textual representation of the message element based on content metadata associated with the message element.

17. A method, comprising:
accessing, by a system comprising a processor, message information for generating a message, wherein the message information comprises body text information of the message and a message element that comprises content exclusive of the body text information;
accessing, by the system, environmental information comprising environmental lighting information related to an operating environment of a mobile device;
determining, by the system, a layout for the message in a message display pane of a messaging environment based on an available display area of the mobile device and an active portion of the message display pane of the messaging environment, wherein the layout comprises a position of the body text information and a position of a token that is a scalable visual representation of the message element, wherein:
a base scale of the token is determined from a set of scales comprising a text only scale associated with generating a textual representation of the message element, an icon only scale associated with generating an icon representation of the message element, a reduced image scale associated with generating a less than 100% sized representation of the message element, a full size image scale associated with generating the 100% sized representation of the message element, and an enlarged image scale associated with generating a greater than the 100% sized representation of the message element;
a second scale of the token is determined from the set of scales that is different than the base scale based on the environmental information and the active portion of the message display pane;
a third scale of the token is determined from the set of scales that is different than the base scale and different than the second scale based on the environmental information and another portion of the message display pane; and
rendering, by the system, the message in the message display pane of the messaging environment based on the layout, wherein the layout represents the position of the message body text information as not overlapping the position of the token, and wherein the token is scaled in response to the token being determined to have moved from the active portion to the other portion of the message display pane.

18. The method of claim 17, further comprising determining, by the system, a level of difference between the base scale and the second scale for the token based on a size of the active portion of the message display pane of the messaging environment.

19. The method of claim 18, further comprising changing, by the system, the level of difference between the base scale and the second scale in response to determining that changes have occurred in the size of the active portion of the message display pane of the messaging environment.

20. The method of claim 18, further comprising determining, by the system, a level of difference between the second scale and the third scale for the token based on a distance between a boundary of the active portion of the message display pane and a boundary of the other portion of the message display pane.

21. The method of claim 17, wherein the accessing the message information comprises accessing visual content exclusive of the body text information.

22. The method of claim 17, wherein the accessing the message information comprises accessing a visual representation of audible content of the message, exclusive of the body text information.

23. The method of claim 17, further comprising:
generating, by the system, a set of tokens embodying the set of scaled visual representations for the content comprising a full sized representation, a thumbnail representation, an icon representation, a textual representation, an enlarged representation, and a representation scaled at a scale between the full sized representation scale and the thumbnail representation scale.

24. A system, comprising:
a memory to store executable instructions; and
a processor, communicatively coupled to the memory, that facilitates execution of the executable instructions to perform operations, comprising:
receiving information comprising instant active display area information of a message display pane of a threaded messaging environment and information related to an available display area of the message display area of the threaded messaging environment, wherein a message comprises body text of the message and a message element that comprises message content exclusive of body text;
receiving device information comprising illumination information related to an environmental condition of a device comprising the available display area;
determining a current scale level for a token that is a scalable visual representation of the message element based on the device information, the instant active display area information, and the information related to the available display area, wherein the current scale level is selected from a set of scales comprising, in order, a text only scale associated with generating a textual representation of the message element, an icon only scale associated with generating an icon representation of the message element, a reduced image scale associated with generating a less than 100% sized representation of the message element, a full size image scale associated with generating the 100% sized representation of the message element, and an enlarged image scale associated with generating a greater than the 100% sized representation of the message element;
determining a lower scale level for the token from the set of scales;
generating the token based on the lower scale level;
reducing a selectable scale of the token in response to the token being determined to have moved from an instant active display area of the message display area of the messaging environment in accordance with a selectable scaling based on the lower scale level, the device information, the instant active display area information, and the information related to the available display area; and
determining a layout of a rendering of the message in the message display pane of the threaded messaging environment, wherein the layout represents the token as not overlapping the body text information.

25. The system of claim 24, wherein the message content comprises visual content exclusive of the body text information.

26. The system of claim 24, wherein the message content comprises a visual representation of audible content of the message, exclusive of the body text information.

27. A method, comprising:
accessing, by a system comprising a processor, message information for generating a message, wherein the message information comprises body text information for the message and a message element that comprises content exclusive of the body text information;
determining, by the system, a first scale level for a token that is a scalable visual representation of the message element based on device information comprising illumination information, active display area information, and available display area information, wherein the current scale level is selected from a set of scales comprising, in order, a text only scale associated with generating a textual representation of the message element, an icon only scale associated with generating an icon representation of the message element, a reduced image scale associated with generating a less than 100% sized representation of the message element, a full size image scale associated with generating the 100% sized representation of the message element, and an enlarged image scale associated with generating a greater than the 100% sized representation of the message element;
determining, by the system, a second scale level, different from the first scale level for the token from the set of scales based on the device information, the available display area information, and another display area other than the active display area associated with the active display area information;
determining, by the system, a layout for rendering of the message based on an available display area of a target mobile device and an active area of a messaging environment, wherein the layout comprises the body text information not overlapping the token, and wherein the token employs the second scale level based on information that the token has moved from the active display area to the other display area; and
transmitting, by the system, the layout for render of the message on a message display pane of a messaging environment of the target mobile device.

28. The method of claim 27, further comprising:
generating, by the system, a set of scaled visual representations for the token, embodying the selectable scaling, the set of scaled visual representations comprising an enlarged representation, a full size representation, a reduced representation, a thumbnail representation, an icon representation, and a textual representation based on metadata associated with the content.

* * * * *